United States Patent
Temple (10) Patent No.: US 9,060,501 B2
(45) Date of Patent: Jun. 23, 2015

(54) FISHING SINKER

(71) Applicant: Edward Temple, Singer Island, FL (US)

(72) Inventor: Edward Temple, Singer Island, FL (US)

(*) Notice: Subject to any disclaimer, the term of this patent is extended or adjusted under 35 U.S.C. 154(b) by 0 days.

(21) Appl. No.: 14/502,335

(22) Filed: Sep. 30, 2014

(65) Prior Publication Data
US 2015/0089860 A1    Apr. 2, 2015

Related U.S. Application Data

(60) Provisional application No. 61/885,206, filed on Oct. 1, 2013.

(51) Int. Cl.
*A01K 95/00* (2006.01)
*A01K 95/02* (2006.01)

(52) U.S. Cl.
CPC ............... *A01K 95/005* (2013.01); *A01K 95/02* (2013.01); *A01K 95/00* (2013.01)

(58) Field of Classification Search
CPC .......... A01K 95/00; B28B 1/14; B29C 33/62
USPC ............... 43/43.1, 44.89, 44.9, 44.91, 44.96, 43/44.97, 4.5; 264/333, 337
See application file for complete search history.

(56) References Cited

U.S. PATENT DOCUMENTS

| | | | |
|---|---|---|---|
| 3,638,347 A | 2/1972 | Kochevar | |
| 3,650,785 A * | 3/1972 | Ball et al. | 106/644 |
| 3,834,059 A | 9/1974 | Overstreet | |
| 3,852,907 A | 12/1974 | Haught | |
| 4,649,663 A | 3/1987 | Strickland | |
| 5,162,060 A * | 11/1992 | Bredow et al. | 106/808 |
| 5,243,779 A | 9/1993 | Reed | |
| 5,406,739 A | 4/1995 | Lu | |
| 5,447,564 A * | 9/1995 | Xie et al. | 106/644 |
| 5,588,248 A | 12/1996 | Cornell, Jr. et al. | |
| 5,786,416 A | 7/1998 | Gardner et al. | |
| 6,076,297 A | 6/2000 | Lippincott | |
| 6,497,069 B1 | 12/2002 | Acworth et al. | |
| 8,532,815 B1 * | 9/2013 | Ciuperca | 700/198 |
| 2004/0145078 A1 * | 7/2004 | Merkley et al. | 264/236 |
| 2008/0289538 A1 * | 11/2008 | Friedrich et al. | 106/284.02 |
| 2009/0085253 A1 * | 4/2009 | Kruss | 264/333 |
| 2012/0017490 A1 * | 1/2012 | Wessner | 43/43.12 |
| 2014/0260034 A1 * | 9/2014 | Ciuperca | 52/405.3 |
| 2014/0333010 A1 * | 11/2014 | Ciuperca | 264/338 |

FOREIGN PATENT DOCUMENTS

| | | | |
|---|---|---|---|
| CN | 1389107 | * | 1/2003 |
| KR | 100798138 | * | 1/2008 |
| KR | 20120038656 | * | 4/2012 |
| WO | WO2012/169908 | * | 12/2012 |

* cited by examiner

*Primary Examiner* — Darren W Ark
*Assistant Examiner* — Magdalena Topolski
(74) *Attorney, Agent, or Firm* — McHale & Slavin, P.A.

(57) ABSTRACT

Disclosed is a lead-free fishing sinker and a method of manufacturing. The sinkers are constructed from a combination of colored grout and a countertop mix having a superplasticizer additive. The mixture is about 60% colored grout and 40% countertop mix having a super plasticizer additive. A liquid mixture includes a 50/50 mixture of water and latex additive to be added to the dry mixture. Steel pellets are placed within the admixture before placement into a cold mold to form any size or shape fishing sinker. The fishing sinkers can be made of most any shape and include a receptacle for holding simulator skirts or dry chum pellets.

11 Claims, 5 Drawing Sheets

FIG. 13 EGG BUNKER W/RUBBER SKIRT

FIG. 14 SUBMARINE SINKER W/NYLON HAIR SKIRT

FIG. 15

FISHING SINKER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 61/885,206 entitled "Lead Free Fishing Sinker and Method of Manufacturing", filed Oct. 1, 2013, the contents of which are hereby expressly incorporated herein by reference.

FIELD OF THE INVENTION

This invention is directed to the field of fishing and, more particularly, to a lead-free fishing sinker.

BACKGROUND OF THE INVENTION

Conventional fishing sinkers, also referred to as lead weights, commonly break off when fishing wherein they settle on the bottom of the water. Lead is an inexpensive heavy metal that works effectively to keep fishing bait where a fisherman wants the bait placed. Unfortunately lead is also a poisonous and hazardous material. The U.S. Government has outlawed lead in the manufacturing of many products such as paint, gasoline, pottery, toys and so forth.

Lead is recognized in causing health problems as it can build up in the body. Lead poisoning is known to slow a child's physical growth and mental development and can cause behavior and nervous system problems, including reproductive problems, kidney and liver damage, blindness and even death. It is well known that unborn babies and young children are at the greatest risk and hazardous warning labels are commonly posted to warn pregnant women, women of childbearing age and young children if a product contains lead in hopes of minimizing lead exposures.

While warning labels are posted on products that contain lead, wildlife has no such warning. Loss of lead fishing sinkers is a routine part of fishing. Unfortunately lost sinkers may be mistaken for food and swallowed by water birds such as ducks, geese, swans, gulls, or loons. Fish may also swallow lost lead sinkers. Toxic effects of even a single lead sinker can cause birds to sicken and increases the risk of death through predation, exposure, or lead poisoning.

New York State passed legislation in 2004 that prohibits the sale of lead fishing sinkers (including "split shot") weighing one-half ounce or less. Environmental Conservation Law, Section 11-0308 states in part, that no person shall sell at retail or offer for retail sale lead fishing sinkers weighing one-half ounce or less; each day of sale or offering for sale shall constitute a separate violation of this section.

Maine and New Hampshire also passed a ban on lead sinkers less than one ounce. Massachusetts banned lead sinkers less than one ounce starting Jan. 1, 2012. Great Britain banned the use of all lead sinkers since 1987. Canada banned the use of lead sinkers and jigs in national parks. The U.S. Fish and Wildlife Service is currently considering a ban on the use of lead sinkers and jigs on national wildlife refuges where loons and trumpeter swans breed. While many States and countries are beginning to enact legislation to address the lead issue, it is notable that the concern is mainly directed to small lead shot. Lead sinkers come in all sizes and sinkers larger than one ounce litter the sea beds. The amount of lost fishing weights is enormous.

By way of example, over a 12 month period ending Jun. 30, 2012, Florida issued 1,619,340 sport, fresh water, salt water and special species angler licenses. Florida also issued 5,061 fishing charter captains and charter boat fishing licenses. Residents and non residents need a license to fish, but from shore those fisherman age 65 and older are exempt. Charter fishing is also a big business in Florida. It is estimated that over 1.5 million anglers go fishing by charter boats. That means there are over 3 million legal licensed anglers per year in Florida. On average it is estimated if each angler lost 2 fishing weights at 1 oz each for the year that would calculate to a loss of 375,000 lbs (20 tons) of lead being placed into Florida waters only each year. Florida is just one state, so across America, hundreds of tons of lead is lost every year. New York, Massachusetts and the like states did not ban lead sinkers over one ounce.

A technique known as deep drop fishing, wherein bait can be lowered to 1,800 feet deep, require weight of at least 10 pounds to expedite sinking and prevent drifting. Such weights are commonly lost if the line is snagged or if a large fish bites through a line. Further, fisherman can rig their lines to have the weights release when a large fish, such as a swordfish, takes the bait. With the increase of deep drop fishing, the above estimate of lead loss is even greater.

While most fishermen do not want to lose their tackle, they do and sometimes they lose lots of tackle. Fishermen want to place their bait where the fish are and that is usually amongst weeds, rocks, wrecks and reefs. When a fish takes the bait it instinctively attempts to escape and will wrap the fishing line around most any structure with the end result being the fisherman losing the tackle.

Because lead is poisonous a number of prior art patents address various alternatives to lead sinkers. U.S. Pat. No. 3,834,059 discloses a weight having a water insoluble material and a water soluble wedge releasably mounted to the weight. The wedge dissolves in water to release the weight.

U.S. Pat. No. 3,852,907 discloses a sinker having an elongated jacket with an opening for receiving a fishing line. The jacket of the sinker includes an aperture for insertion of wolframite particles.

U.S. Pat. No. 4,649,663 discloses a slip sinker slidably mounted on a line consisting of a length of pliable plastic material extending through and secured to an elongated tapered body. The line extends through the plastic material and the line is free to move within the sinker. The plastic sleeve extends completely through the sinker and projects a short distance of 1/32 of an inch on opposite sides thereof so that the line can freely move through the plastic liner.

U.S. Pat. No. 5,243,779 discloses a snagless fishing sinker having non-toxic biodegradable metal balls surrounded and encased by a non-toxic biodegradable woven sleeve and contained in a supple sinker configuration. This does not conform to the look that most fishermen are using for fishing sinkers.

U.S. Pat. No. 5,406,739 discloses a fishing sinker of iron material having a through hole for passing a fishing line, or a slit for holding a fishing line, and a method of making a fishing sinker of iron material without the use of die casting and a punching tool.

U.S. Pat. No. 5,588,248 discloses a fishing weight formed from a zinc alloy which is environmentally safe having a protective coating covering the entire outer surface. The covering is non-corrosive when exposed to water so that if it is chipped or broken, the zinc alloy of the weight will not contaminate the environment. The use of zinc alloy and alloy composition is expensive, and the die casting machines are also expensive.

U.S. Pat. No. 5,786,416 discloses a high specific gravity composition suitable for use as a lead-substitute, especially for firearms ammunition and angling weights, comprising a polymer matrix having at least one rigid thermoplastic polymer matrix containing component, e.g. polypropylene, polystyrene, etc. and at least one elastomeric thermoplastic polymer component, e.g. various polystyrene-based copolymers; and dispersed in the polymer matrix particles of a high specific gravity weigh. The high specific gravity weight material is preferably tungsten powder.

U.S. Pat. No. 6,076,297 discloses a fishing line weight comprising a natural weight and an elastomer devoid of lead. In one embodiment, the weight has a hole through its body which serves to hold the elastomer which after passing through the hole is fixed to the weight by nodules at each end upon which loops are attached to the fishing line. In an alternative embodiment, a groove is circumscribed around the weight with an elastomeric band placed within the groove.

U.S. Pat. No. 6,497,069 discloses the use of a barrier coating over the surfaces of sinkers. The coating is subject to degradation in an underwater environment. Sinker bodies are pressed from metal iron powder and immersed to paint the line passageway. The iron sinker is made from iron power and compressed in a mold at pressures upwards of 45 tons per square inch and hardened by heating at a high temperature for at least 30 minutes.

There is a need for a lead free fishing sinker that will not harm the environment.

SUMMARY OF THE INVENTION

Disclosed is a lead-free fishing sinker and a method of manufacturing. The method of constructing lead-free fishing sinkers includes the steps of forming a dry mixture from about 60% grout with about 40% countertop mix having a super plasticizer additive, stirring together an equal amount of water with an equal amount of liquid latex to form an admixture wherein the admixture has a consistency similar to pancake batter. Steel pellets are added to the admixture for placement into cold molds to form shaped fishing sinkers. The sinkers are constructed from a combination of colored grout and a countertop mix which includes a super plasticizer additive.

An objective of the invention is to provide a fishing sinker that will not pollute the water or otherwise harm the environment, wildlife, or humans that come in contact with fishing sinkers.

Still another objective of the invention is to teach a method of manufacturing a lead free fishing sinker using a cold form process to produce a sinker that is safe for disposal in the environment.

Another objective of the invention is to provide a fishing sinker that will not pollute the water or otherwise harm humans, wildlife, or the environment.

Still another objective of the invention is to provide a fishing sinker that looks like a conventional fishing sinker.

Yet still another objective of the invention is to provide a fishing sinker that is inexpensive to manufacture and is competitively priced with conventional sinkers.

Another objective of the invention is to provide a fishing sinker that is designed to degrade when left in water.

Another objective of the invention is to provide a fishing sinker that is colored to blend in with most waters.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE PREFERRED EMBODIMENT

Lead-free fishing sinkers of the instant invention are constructed from a mixture comprising approximately 60% colored grout with about 40% countertop mix having a super-plasticizer mixed therein. The grout and countertop mix is added with and equal part of water and latex additive. The super-plasticizer reduces bubbles by lowering the viscosity of the grout without increasing the water content. The countertop mix being a high strength concrete mix commonly used for pre-cast and cast-in-place concrete countertop applications. The super-plasticizer being a commonly known substance added in an amount sufficient to keep the material pliable, typically an acrylic bonder that improves the masonry tensile strength of the mixture. The latex additive makes the grout and mortar sticky for suspending steel pellets within a mold and improves the bond strength of the mixture.

Upon mixing a consistency is made that assimilates pancake batter and steel pellets are added to the mixture before placement in into a mold. A reinforcement wire is preferable placed into the mixture during the molding process. In a preferred embodiment the grout includes a green color additive. The shade of green is selected and found to be the best blend with lake and ocean waters with a dark background. With the proper shade of green the sinker will appear to disappear within a few feet of submersion.

Non-coated mild steel pellets placed within the mixture includes an iron content capable of dissolving when left in water. When placed within the mixture, prolonged exposure to water will expedite the dissolving process by the creation of rust and subsequent break-up of the sinker. The steel pellets are lead free and preferably formed from a mild steel wire which is cut into pieces. The steel pellets can also be electroplated with copper or zinc before use to slow up the period of rust. High iron stainless steel such as 304SS can also provide a longer period of use before rusting. In the preferred embodiment the pellets measured form about 80% of the dry mix volume.

In forming of the sinker, a liquid latex rubber mold liner is employed. Unlike the molds used for lead sinkers, where the lead is heated to 800 degrees to liquefy, the mixture for the instant invention can be made of any material as heating and/or pressure is not needed. For example, a wood mold can be formed on a lathe wherein a 1/8" hole is drilled through the center of the mold. A 1/8" steel rod is then placed through the hole, the liquid latex rubber mold liner placed therein. When dry, the steel rod is pulled out and a slit is cut in the mold top. The latex rubber mold is ready to make sinkers. The mold is sprayed with a mist of soft water and a small amount of retarder additive. The spray coats the inside of the mold and acts as a lubricant to help release the cured cast from the mold. The mix sets up fast and cures to 6000 psi strength.

Egg sinker molds have a 1/8" hole at the top and bottom. After the mold is filled a 1/8" plastic rod is inserted through the bottom hole and up through the top hole. The holes let any trapped air out and the rod pushes mix against the molds walls. After 2 to 3 hours of curing the cast can be pulled from the mold. The rod is also pulled leaving a egg sinker with a perfect round hole in the center. After curing overnight, the sinkers are dipped or sprayed with clear gloss acrylic grout sealer. The sealer provides an ascetically pleasing appearance of a new product and further provides a coating on the grout to slow the speed of destruction. In manner a sinker can be reused many times, even if not proper rinsed after use in salt water. Eventually the coating becomes marred from use, e.g. dragging on the ocean or lake bottom, impact without sinkers in the tackle box, etc. . . . , of prolonged exposure to the elements. Once the coating is marred, the porosity of the mixture allows water to reach the pellets to create corrosion. The corrosion, or rust, causes the pellets to expand which breaks the sinker into smaller pieces.

Most popular sinkers are known as egg, bank, pyramid, cigar, stick, and heavy weighted heads. Two new names for sinkers that were created are the submarine and the acorn. The subs are a long cylindrical shape with blunt round ends and a 1/8" hole in the center. They can be made in many weight sizes. The acorn is very small and looks like an acorn.

In past years the price for raw lead has doubled every 10 to 12 years so the price of new lead sinkers will always be going up. Cost of materials to make lead free sinkers of the instant invention in small quantities at retail prices is $2.50 a pound. Large volume buying at discount prices will cut the material's cost in half. At $1.25 a pound, it is almost the cost of lead, not counting the energy cost to melt the lead. The molded fishing sinker of the instant invention is extremely hard, but over time the material will decay in fresh or salt water. In salt water, test results indicate that algae sponges and hydroids have an affinity for sinkers made from the green grout mixture. Soon after being unattended in sea water, the above sea life attach to the sinker surface and start growing. The casted sinker has a microscopic rough surface. The rough surface, green color and iron secretion is a big factor for sea life attachment and fast growth. By way of example, two sinkers in the size and shape of a silver dollar were placed underwater in a lagoon in south Florida. After one year the sinkers were encrusted with sea life the size of a baseball. A small bank sinker was also placed underwater and doubled its size with sea life in 6 months. The encrusting Organisms on the sinkers included:

*Porifena*—(sponges)
  1. *Anthosigmella varians* (Variable Sponge)
  2. *Chondrilla nucula* (Chicken Liver Sponge)
*Cnidaria—Hydrozoa*—(Hydrozoans)
  3. *Pennaria tiarella* (Ferm Hydroid)
*Anthopoda—Crustacea—Cirripedia*—(Barnacles)
  4. *Balanus eburneus* (Ivory Barnacle)
  5. *Balanus improvisus* (Bay Barnacle)
*Ectoprocta* (Bryozoan Moss Animals)
  6. *Schizoporella errata* (Variable Bryozoan)
*Urochordata*—(Tunicates)
  7. *Botrylloides nigrum* (Black Colonial Tunicate)
  8. *Ascidia niger* (Black Ascidian)
*Mollusca*—(Clams, Snails)
  9. *Pinctada radiate* (Pearl Oyster)
*Annelida*—(Sea Worms)
  10. *Serpulorbis* sp. (Tube Worms)

Figure 1:
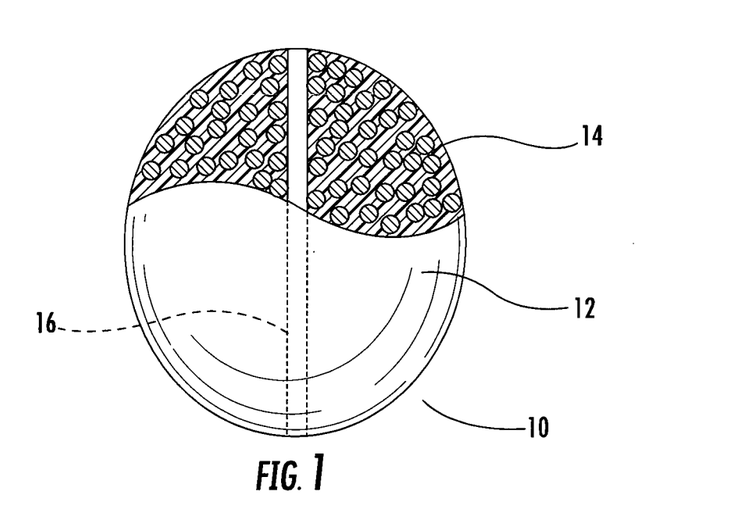
FIG. 1 is a front view of an egg sinker with a partial cross sectional.

Referring to FIG. 1, illustrated is an egg sinker 10, having a sinker body 12 that houses the steel pellets 14. A hole 16 is placed through the sinker body 12 for placement of a fishing line. The sinker body 12 is formed such that all pellets are essentially hidden from the surface. After submersion for a period of time microscopic openings in the sinker body 12 allow water to attach to the steel pellets where normal oxidation occurs. As the pellets oxidized they enlarge which will cause the sinker body 12 to destruct. With each level of destruction more pellets are exposed causing further and quicker oxidation of the remaining pellets. The mixture used to encompass the steel pellets will return to the earth in their original form.

Figure 2:
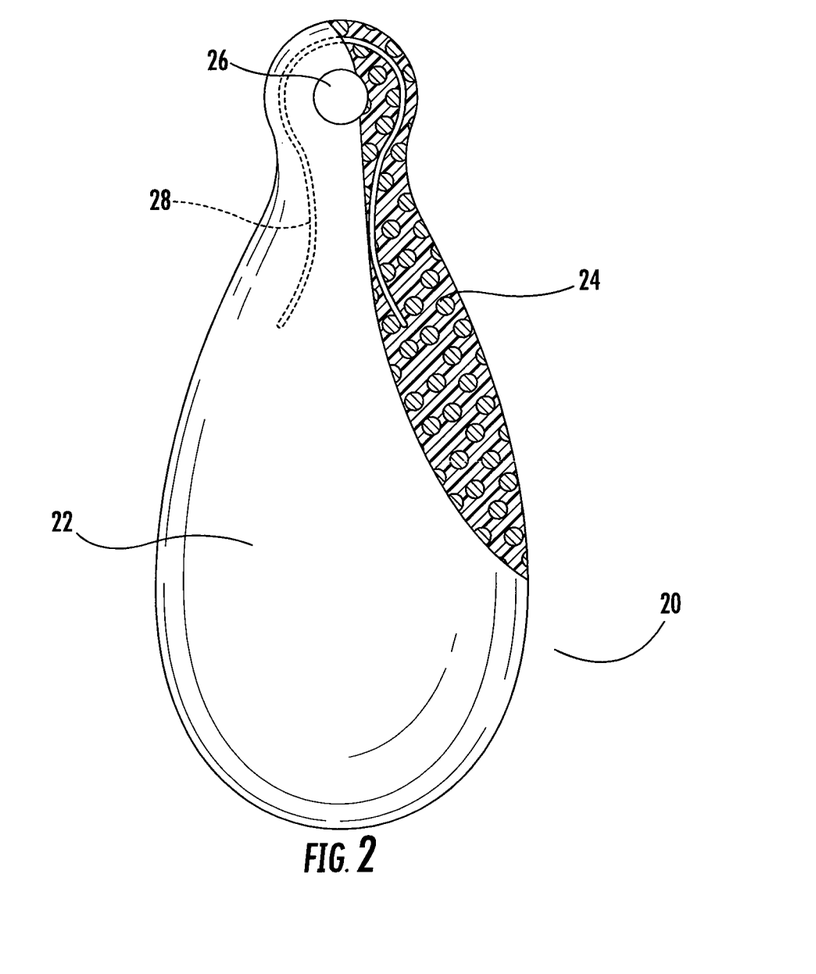
FIG. 2 is a front view of a bank sinker with a partial cross sectional.

FIG. 2 is an illustration of a bank sinker 20 having a sinker body 22 for containing of the steel pellets 24. In this embodiment a line hole 26 is formed through the sinker for placement of a fishing line. A steel reinforcement wire 28 is placed around the line hole 26 providing strength to the structure. It is noted that the wire 28 should be constructed from the same mild steel as the pellets allowing for subsequent oxidation.

Figure 3:
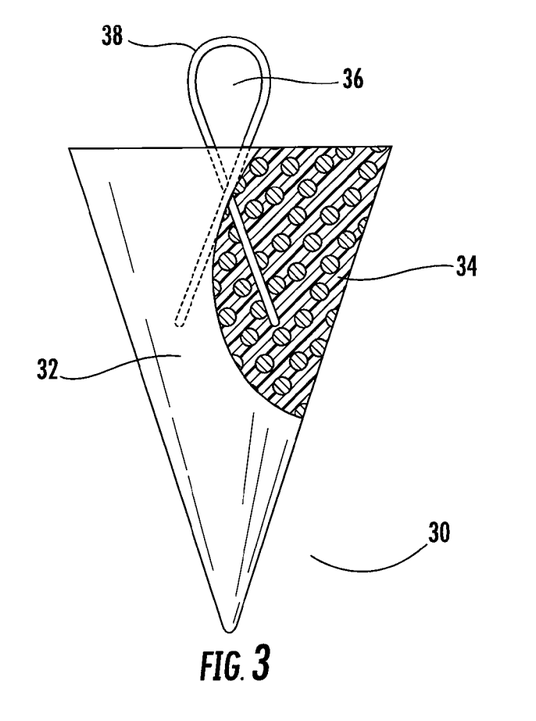
FIG. 3 is a front view of a pyramid sinker with a partial cross sectional.

FIG. 3 is an illustration of a pyramid sinker 30 having a sinker body 32 for containing of the steel pellets 34. In this embodiment a line hole 36 is formed external the sinker for placement of a fishing line. A steel reinforcement wire 38 is used to form the line hole 36 along an upper section with the ends of the wire embedded in the material. In this embodiment, the wire 38 is again made from mild steel but is preferably electro coated with zinc to extend the life of the wire as it exposed to the elements, as compared to be placed completely with the sinker body.

Figure 4:
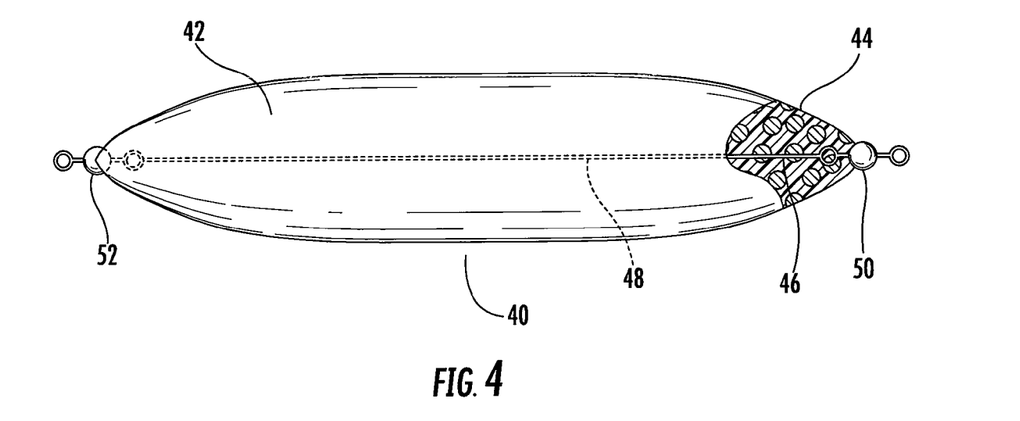
FIG. 4 is a front view of a cigar trolling weight with a partial cross sectional.

FIG. 4 is an illustration of a cigar trolling weight sinker 40 having a sinker body 42 for containing of the steel pellets 44. In this embodiment a trolling wire 46 is placed through a line hole 48, or formed integral to the weight, wherein a swivel 50 can be placed at one end and barrel swivel 52 can be placed at another end. Trolling weights are placed in the length of the fishing line, the trolling wire 46 providing a junction along the fishing line causing trailing bait to be trolled beneath the water line.

Figure 5:
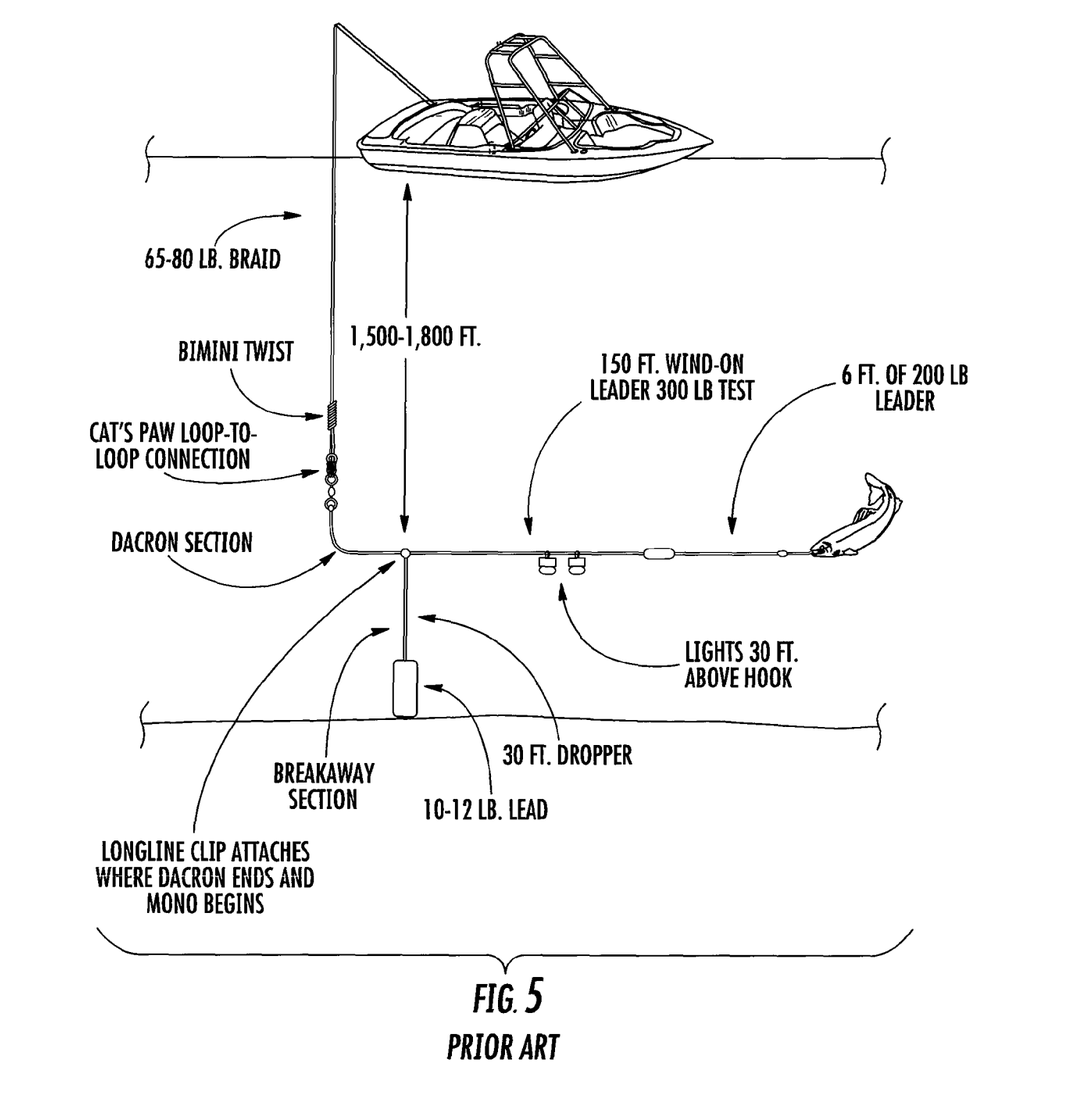
FIG. 5 is a pictorial of a prior art employment of a deep drop use of lead weights.

FIG. 5 is a pictorial of a prior art employment of a deep drop use of lead weights. Depicted is a conventional deep drop bait with a 10-12 lb. lead weight designed to break off once the bait is taken. This is a highly expendable and expensive loss of a sinker. In this use the loss amounts to 10-12 lbs of lead in an effort to catch a fish. Unfortunately the loss of the weight does not always result in the fisherman retrieving a fish.

Figure 6:
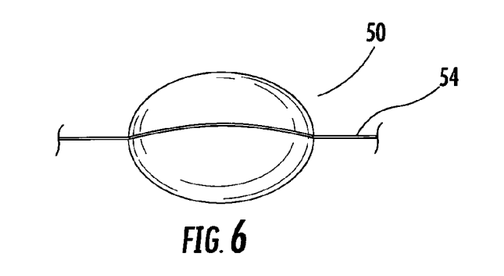
FIG. 6 is a front view of a tie-on sinker with a partial cross sectional.
Figure 7:
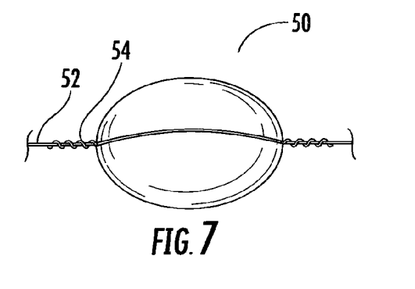
FIG. 7 is a front view of a tie-on sinker on a fishing line with a partial cross sectional.

FIGS. 6 and 7 illustrate tie-on sinker (50). The advantage with a tie-on sinker is more weight can be added on a fishing line very quickly, and excess weight removed. Tie-on sinkers (50) can come in all sizes and do the job better than lead sinkers. No tools needed and better gripping on the fishing line with large size sinkers. Tie-on sinkers are made with a mold of two identical halves with a slot to hold a flat wide rubber strip on one side and a metal wire on the other. After the cast is hard and pulled from the mold, a pull from both ends of the rubber strips releases it from the casting. This will make a perfect slot in the casting from end to end and to the middle with a wire at both ends. The anchoring of a tie-on sinker (50) is caused by inserting the fishing line (52) through the slot and twisting the metal twist wire (54) around the fishing line (52) at both ends to make the sinker (50) secure. It is easy to adjust the fishing line (51) weight by adding or subtracting sinkers for tide change, river and ocean stream movement. Conventional split shot and rubber grip weights are made of lead which is crimped on a fishing line with a tool. The rubber grip has a slot where the fishing line is inserted and the rubber in the sinkers center grips to hold the line in place. If not installed correctly, both sinkers can easily dislodge itself. The tie-on sinkers provide a direct substitution without the need for malleable lead.

Many fishermen that target large fish such as marlin, sailfish and tuna, require a long leader line with a heavy sinker to get the bait to a depth where the fish are. When a fish is caught the object is for the fisherman to bring the fish to the side of the boat for the best control. A long leader and weight stops the reeling for tight control. Typically an individual must use the procedure known as hand lining to bridge the gap between the boat and fish. A large fish can easily pull the individual overboard. An uncontrolled fish can jump into the boat, causing havoc, damage, injury and even death. With a tie-on sinker (50) on the line, the mate can easily relieve the metal twist wire (54) to let the sinker (50) slide down to the fish or completely untie the metal twist wire (54) and remove the sinker.

Figure 8:
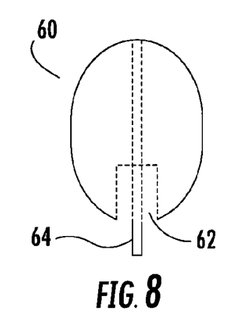
FIG. 8 is a cross sectional view of a egg sinker with cavity/receptacle.
Figure 9:
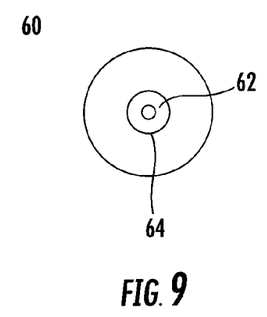
FIG. 9 is an end view of FIG. 8.

Referring to FIGS. 8 and 9 is the egg sinker (60) design, which is molded with a cavity (62) at the end of approximately 3/8" in diameter by 3/8" to 1/2" deep. Cast fill the mold and insert a 1/8" hollow tube (64) into the mold and let it dry. Pull the egg sinker (60) from the mold and cut the tube (64) close to the top and 3/8" to 1/2" from the bottom of the cavity (62).

Figure 11:
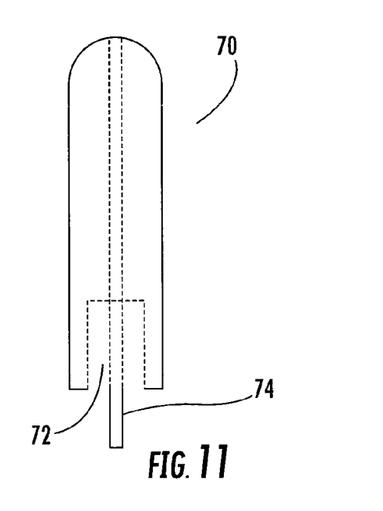
FIG. 11 is a is a cross sectional view of a submarine sinker with a cavity/receptacle.
Figure 12:
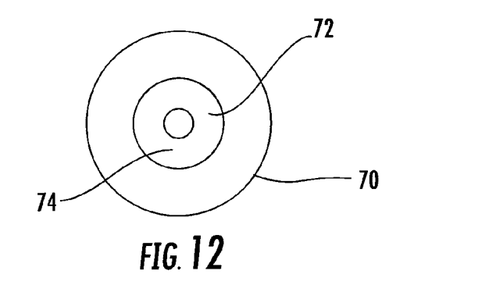
FIG. 12 is an end view of FIG. 11.

FIGS. 11 and 12 is an illustration of the submarine sinker (70) design, which like the egg sinker (60) is molded with a cavity (72) at the end of approximately 3/8" in diameter by 3/8" to 1/2" deep. Cast fill the mold and insert a 1/8" hollow tube (74) into the mold and let it dry. Pull the submarine sinker (70) from the mold and cut the tube (74) close to the top and 3/8" to 1/2" from the bottom of the cavity (72).

Figure 10:
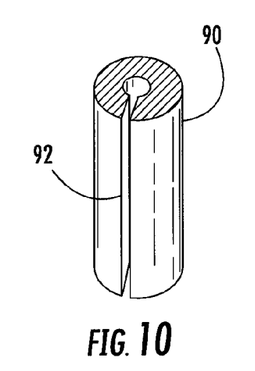
FIG. 10 is a perspective view of a dry chum pellet.

Referring to FIG. 10, dry chum pellets (90) cylindrical 3/8" shape with a slit (92) down the side to a 1/8" center bore and 3/4" to 1" long. The dry chum pellets (90) slide over the fishing line down over the sinker tube and into the cavity for a snug fit. When the chum pellet (90) is in the water it starts to dissolve and water currents carry chum parts over the bait and beyond to lure fish to the bait. This attraction is intended to bring attention to inshore and reef fish.

Figure 13:
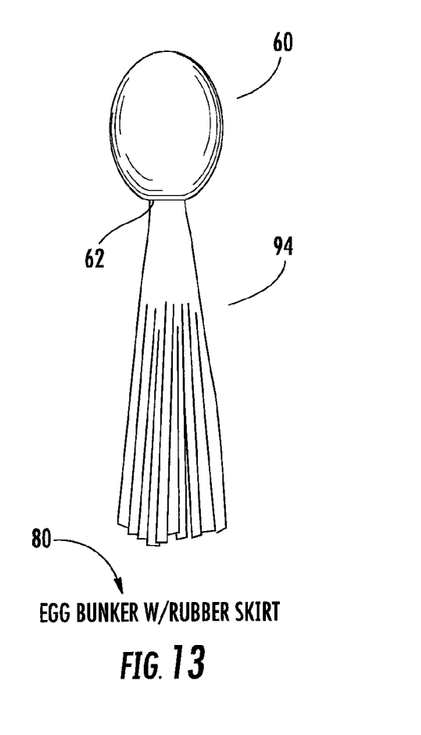
FIG. 13 is a side view of a egg sinker with a skirt bonded in the cavity.
Figure 14:
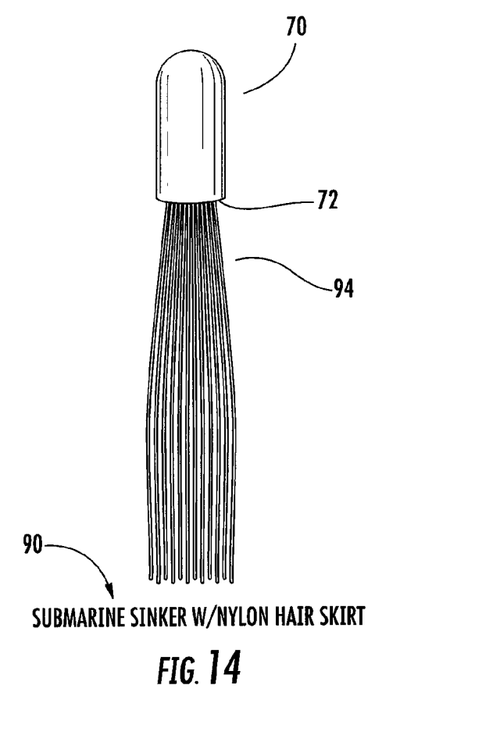
FIG. 14 is a side view of a submarine sinker with a skirt bonded in the cavity.

FIGS. 13 and 14 illustrate the same egg sinker (60) and submarine sinker (70) with a cavity design is shown where a skirt (94) is inserted into the cavities (62 & 72) of the sinkers and securely bonded. The skirts (94) can be made of feathers, rubber or synthetic materials. The intent is to bring attention to bottom and sub-bottom fish on an anchored or drift fishing boat. This attention of a questioning fish brings him to waiting bait.

Figure 15:
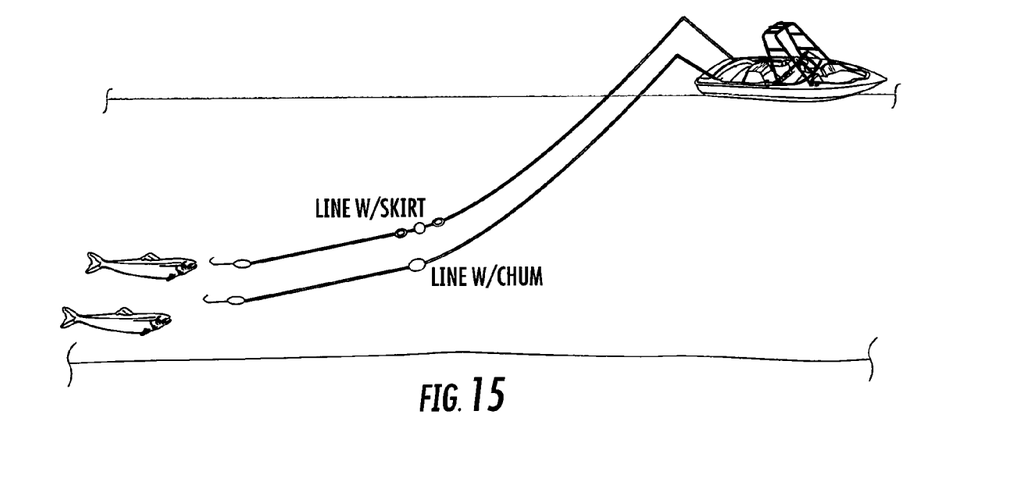
FIG. 15 is a pictorial view of the sinkers in use on a fishing line.

FIG. 15 is a pictorial of the fish attention seeking sinkers in use. Depicted is a conventional anchored or drifting boat with the sinkers on the line. The instant invention provides a method of constructing lead-free fishing sinkers comprising the step of: forming a dry mixture from about 60% grout with about 40% countertop mix having a super plasticizer; forming a liquid mixture from about 50% water with about 50% liquid latex; admixing said dry mixture and said liquid mixture to form an admixture having a consistency similar to pancake batter; adding steel pellets to said admixture; forming a mold in the shape of a desired sinker and coating the mold with a liquid latex rubber mold liner; placing said admixture with steel pellets into said mold; allowing a set-up time of about 3 hours and removing the formed fishing sinker from the mold and curing for about 24 hours.

The sinkers can be made of most any color by adding a dye to the mixture or painting the sinker after the curing step. In the preferred embodiment the color is green. The sinkers can also be coated to seal the natural porosity of the cured mixture to retard water from reaching the steel pellets or steel wire. The steel pellets can be coated to retard rust and in the preferred embodiment the steel pellets are measured at 80% of the dry mix volume.

The mild steel wire can be placed within the admixture to reinforce an aperture used in tying the sinker to a fishing line, or extend from the sinker for securement directly to the fishing line. The wire can be copper or any other mild steel. The method can include the step of forming a centrally disposed groove constructed and arranged to receive a fishing line and with metal wire extending outwardly from at least one end of the groove for use in tying to a fishing line.

In a further embodiment, the method can include the step of forming a receptacle formed into the sinker during the molding process. The receptacle is sized to receive a dry chum pellet and/or a simulated skirt.

In another embodiment the fishing sinker comprises a base formed from a mixture consisting of grout, countertop mix having a super plasticizer, water, liquid latex additive, and steel pellets as previously described with a grove placed in the base with a wire extending outward from the groove for use in tying to a fishing line. The wire can extend from one end or both ends. Copper is the preferred wire as it can be reused without loss of strength. Other mild steel wire may be used but with a recognized limit to its life due to strain hardening.

In another embodiment a fishing sinker comprises a base formed from a mixture consisting of grout, countertop mix having a super plasticizer, water, liquid latex additive, and steel pellets as previously described. In this embodiment a hollow tube extends through the base and a receptacle is formed along a portion of the hollow tube. The receptacle is constructed and arranged to receive a dry chum pellet or a simulated skirt. The skirt can include an opening sized to frictionally engage said hollow tube.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments and are intended to be exemplary and not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of constructing lead-free fishing sinkers comprising the step of:
   forming a dry mixture from about 60% grout with about 40% countertop mix having a super plasticizer;
   forming a liquid mixture from about 50% water with about 50% liquid latex;
   admixing said dry mixture and said liquid mixture to form an admixture having a consistency similar to pancake batter;
   adding steel pellets to said admixture;
   forming a mold in the shape of a desired sinker and coating the mold with a liquid latex rubber mold liner;
   placing said admixture with steel pellets into said mold;
   allowing a set-up time of about 3 hours and removing the formed fishing sinker from the mold and curing for about 24 hours.

2. The method of constructing lead-free fishing sinkers according to claim 1 including the step of adding color to said powder mixture.

3. The method of constructing lead-free fishing sinkers according to claim 2 wherein said color is green.

4. The method of constructing lead-free fishing sinkers according to claim 1 wherein said steel pellets are coated to retard rust.

5. The method of constructing lead-free fishing sinkers according to claim 1 wherein said steel pellets are measured at 80% of the dry mix volume.

6. The method of constructing lead-free fishing sinkers according to claim 1 include the step of placing at least part of a mild steel wire into the admixture.

7. The fishing sinker according to claim 6 wherein said wire is copper.

8. The method of constructing lead-free fishing sinkers according to claim 1 including the step of forming a centrally disposed groove constructed and arranged to receive a fishing line and a metal wire extending outwardly from at least one end of said groove for use in tying to a fishing line.

9. The method of constructing lead-free fishing sinkers according to claim 1 including a receptacle formed into said sinker.

10. The method of constructing lead-free fishing sinkers according to claim 9 wherein said receptacle is sized to receive a dry chum pellet.

11. The method of constructing lead-free fishing sinkers according to claim 9 wherein said receptacle is sized to receive a simulated skirt.

* * * * *